United States Patent

Riggs et al.

[11] 4,319,674
[45] Mar. 16, 1982

[54] AUTOMATED TOKEN SYSTEM

[75] Inventors: Dean D. Riggs, Avon Lake; David M. McCarthy, North Olmsted, both of Ohio

[73] Assignee: Electron, Inc., San Diego, Calif.

[21] Appl. No.: 639,228

[22] Filed: Dec. 10, 1975

[51] Int. Cl.² .............................................. G07F 1/06
[52] U.S. Cl. ................................... 194/4 R; 194/4 F
[58] Field of Search .............. 194/4 R, 4 C, 4 D, 4 E, 194/4 F, 4 G

[56] References Cited

U.S. PATENT DOCUMENTS

| | | | |
|---|---|---|---|
| 3,542,180 | 11/1970 | Segal | 194/4 F |
| 3,578,124 | 5/1971 | Flum | 194/4 R |
| 3,602,695 | 8/1971 | Boss | 194/4 R X |
| 3,673,389 | 6/1972 | Kapsambelis et al. | 194/4 C X |
| 3,766,452 | 10/1973 | Burpee et al. | 194/4 F X |

Primary Examiner—Joseph J. Rolla
Attorney, Agent, or Firm—Fay & Sharpe

[57] ABSTRACT

An automated token system (particularly for toll roads) utilizing a token which may be permanently magnetized and demagnetized. The token is made of permanent magnetic materials such as barium ferrite and a plastic material, is circular and has a uniform thickness.

The system includes a mechanism for magnetically and visually writing on the token at an entrance to a controlled area or road and a reader for reading information at the exit. The mechanism for writing includes an electromagnetic conditioner which erases old information and an electromagnetic head or heads which place data bits of information on the token. An input from a computer and/or shift register and/or switches and appropriate amplifiers signal the electromagnetic heads. The reader for reading includes a scanning head which takes the information from the token and transmits it to a shift register or computer. The reader for reading also includes gating to determine which side of the token is being read and governs which side of the shift register the information is fed into. A computer or binary-to-decimal converters are utilized in conjunction with a display means to give readable information.

The process involved in this invention includes erasing any magnetic information on a token, putting a uniform magnetic field through this token, impressing information in the form of magnetic data bits on the token through its entire thickness so that it may be read from either side and handling the token. The process further includes retrieving the information which includes a magnetic-sensitive token scanner, deciding which side of the token has been read, feeding the information into a shift register or computer so that the information is in the desired order, retrieving the information, converting it to a decimal form and displaying it in a readable manner.

6 Claims, 5 Drawing Figures

AUTOMATED TOKEN SYSTEM

BACKGROUND OF THE INVENTION

1. Field of the Invention

This invention relates to the field of automatic token systems utilizing reusable, recyclable tokens.

2. Description of the Prior Art

On limited access roads or areas, such as turnpikes or parking lots, it is desirable to reduce the number of personnel necessary to collect tolls. It is also desirable to maximize the efficiency of the personnel by automatically calculating the toll or fare. To this end different systems have been utilized, many of which automatically distribute and collect tokens and calculate the amount due.

Many existing systems utilize metal tokens with grooves, notches or similar mechanical variations to denote the gate of entrance and/or class or rate of fare. These physical indicia on the tokens act as indicators of information which are subsequently detected and used to calculate the toll or fare. After collection, the metal tokens are sorted; and if they are to be reused, transported back to their place of origination since they are not only valid for that location. Further sorting may also be necessary if the tokens are valid for only a certain class of vehicle or rate. If not sorted and reused, they are collected and destroyed. The additional transportation costs and/or collection, sorting and manufacture of new metal tokens add to the cost of the entire system and may constitute a security risk.

Another type of automatic fare collecting system is described in the Flum U.S. Pat. No. 3,578,124. It relates to a system for collecting fares or other charges using specially constructed passes. The pass or token comprises a flat, circular or rectangular member. Data is recorded in magnetic form on one side of the token and in erasable, humanly-readable form on the other side. Upon reutilization of the token, both the magnetic and humanly-readable data are erased or updated and new information placed on the token. This system has the disadvantage of not being completely automatic. Because the token has only one side which can be utilized for magnetic information, the token must be carefully placed in its correct relative location with regard to the reading of the magnetic information on the token. This would normally require that the pass is manually taken from the user and correctly oriented in a means for reading it. The orientation is necessary since the information on the token must be adjacent to the means for reading it.

It is highly desirable to automate a reusable and recyclable token collection and distribution system. It would be efficient and economical to provide mechanized distribution and collection of reusable tokens without the necessity of returning the tokens to their place of origin. These desirable features imply the ability to eliminate existing information on a token and replace it with new information so that the tokens may be continuously recycled at every distribution location. It also requires that the information is machine readable, conveniently processed and quickly displayed without manual aid. As a practical matter, the token should contain information, such as the gate of entry, class of vehicle, time, etc. The tokens themselves should be sturdy and not susceptible to being readily damaged or changed by physical abuse, heat, magnetic or electrical fields.

The apparatus and process of this invention meets the criteria set forth above. It utilizes a magnetic token made of a mixture of plastic material and a magnetic material. The tokens are all identical and recyclable. They can be magnetized through their entire thickness thus permitting them to be read from either side. This latter feature is particularly important since it permits the tokens to be tossed at random into a collection means and machine read without the aid of a human collector or complex machinery to orient the token. Such tokens can also be erased and new information placed thereon. The tokens are not made entirely of metal and thus are not susceptible to bending or corrosion from electrolytic action.

SUMMARY OF THE INVENTION

An automated token toll system including a means for magnetically writing on a token. The token is comprised of a material which can be readily magnetized and demagnetized. A means for reading the token from either side includes a display means for indicating information on the token. The process of this invention includes preparing a token which is magnetizable by submitting it to a large electromagnetic field and impressing magnetic data bits on the token through its entire thickness. The process further includes distributing the token to a vehicle, retrieving the token and scanning it to determine the information thereon.

DETAILED DESCRIPTION OF THE DRAWINGS

Figure 1A:
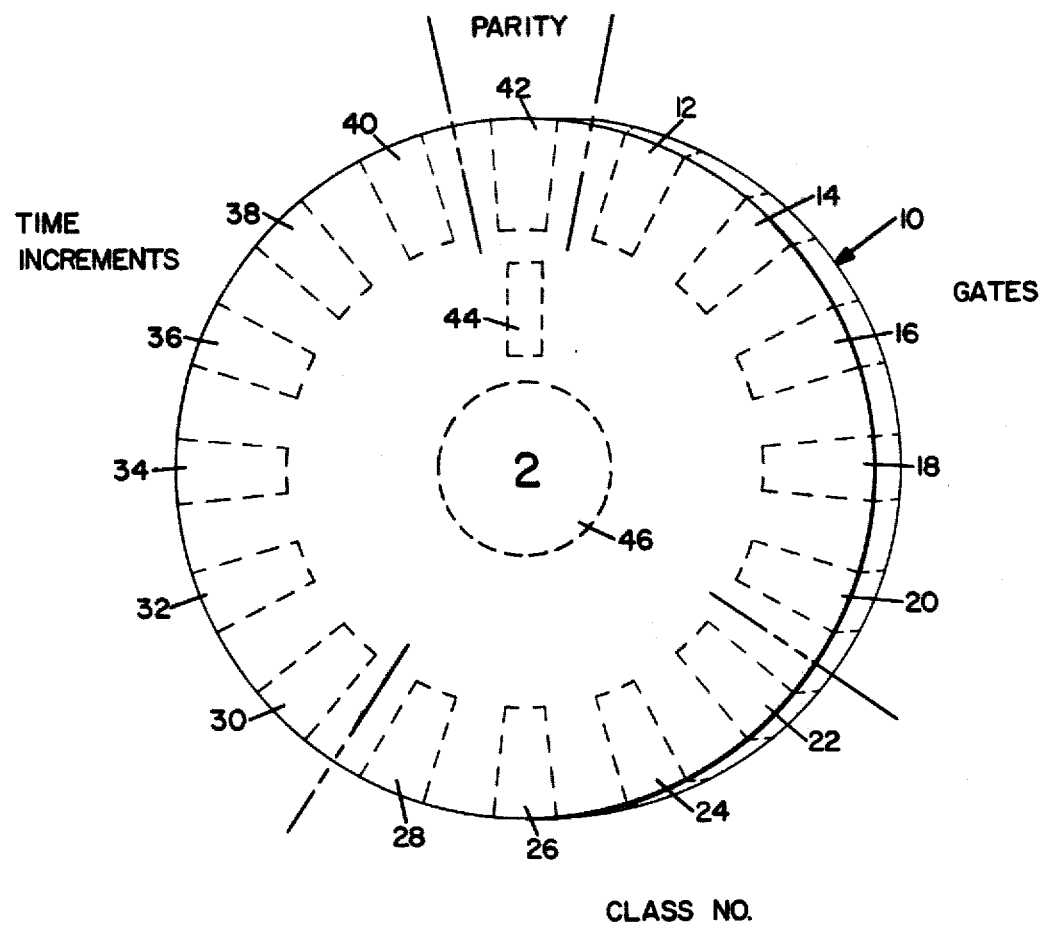
FIG. 1A is a perspective view of the token having data bits shown in phantom.
Figure 1B:
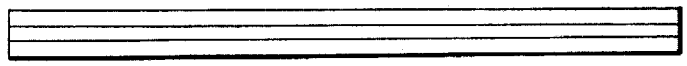
FIG. 1B is a cross-section of an alternate embodiment of a token.

As illustrated in FIG. 1, the token utilized in this invention has a generally circular shape. It is about one to two inches in diameter and about 1/16" to 3/16" thick. A typical token is 1.25" in diameter and ⅛" thick. It should be understood that not only the dimensions but the shape of the token could be changed. It is only necessary that the token have a physical configuration usable with the reading and writing apparatus as defined in more detail hereinunder. That is, the token could have a square, rectangular or irregular shape. The token 10 is made of a combination of barium ferrite, plastic and a binder material. The plastic material utilized is normally thermal setting; however, others may be utilized. The magnetic capabilities which are the important feature of the token are realized by the use of barium ferrite. In this regard, it is also possible to use strontium ferrite as well as other materials. A one-to-one ratio of plastic and barium ferrite has been successful. Barium ferrite has proved to be a useful and workable material since it is capable of retaining a very high magnetic field. The token which is effectively and permanently magnetized by a high magnetic field has a stable configuration. That is, other magnets which may be in a vehicle would not affect the magnetic field on the token either by magnetizing it or demagnetizing it. Barium ferrite with the plastic material is also virtually impervious to any normally found ranges of temperatures. Extreme heat would affect the plastic material before it affected the magnetic field in the tokens. An alternate embodiment of the token is illustrated in FIG. 1A. It represents in cross-section a metallic internal portion 11 surrounded by a plastic outer portion 13. The metal may be iron or some other permanent magnetic material. By way of example, the internal portion would be about 0.003" thick and the external plastic coating of about 0.020" thick. It would work identically to the above-noted token.

In use, the token 10 is impressed with data bits 12 through 42. A data bit does not differ chemically or physically from the rest of the token. It is, in reality, a magnetically-polarized section of the token which has a north and south pole across the thickness of the token 10 which is different from the rest of the token. The data bits 12 through 42 are either magnetized or unmagnetized and, thus, are the basis for a digital system of information.

As noted in the notations around the periphery of the token 10, the data bits may be utilized to represent different types of information. Purely by way of example, data bits 12 through 20 could be utilized to represent the number of the entry gate. Data bits 22 through 28 could represent the class of vehicle, data bits 30 through 40 could represent time increments, data bit 42 could represent a parity signal and data bit 44 would be used to identify the different sides of the token. In this respect, data bit 44 is magnetized to have a north and south orientation which can be identified from the rest of the token by the means for reading the token.

The center 46 of the token 10 represents visual information which commonly would be the gate of entry, but may be any other information. The visual information is obtained with the same type of magnetic information as the other data bits. A magnetic head is shaped in the form of a numeral, for example the numeral 2 as shown in FIG. 1, so that at the time of distribution nothing is actually visible on the token. However, when the information is later read off of the token, iron filings or a magnetic tape reader may be utilized to create a visible image at the center of the token. The data bit 44 represents information that indicates which side of the token is being viewed as described in more detail hereinbelow.

Figure 2:
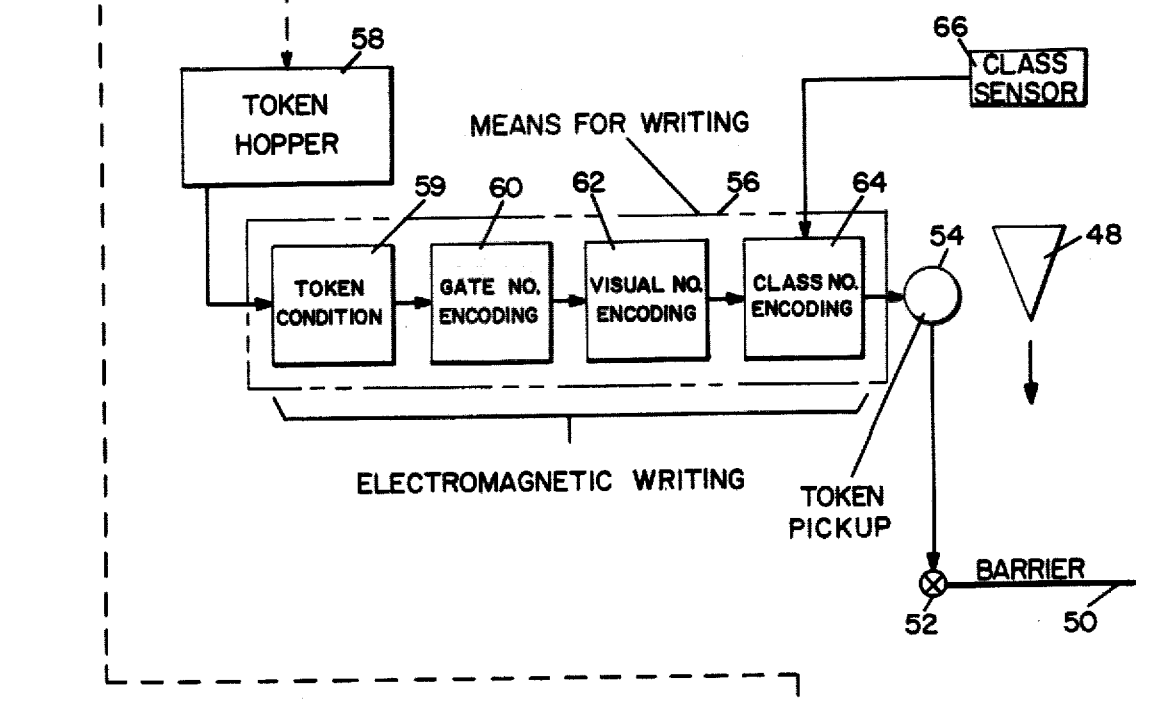
FIG. 2 is a block diagram of the physical and electrical components of this invention.
Figure 2:
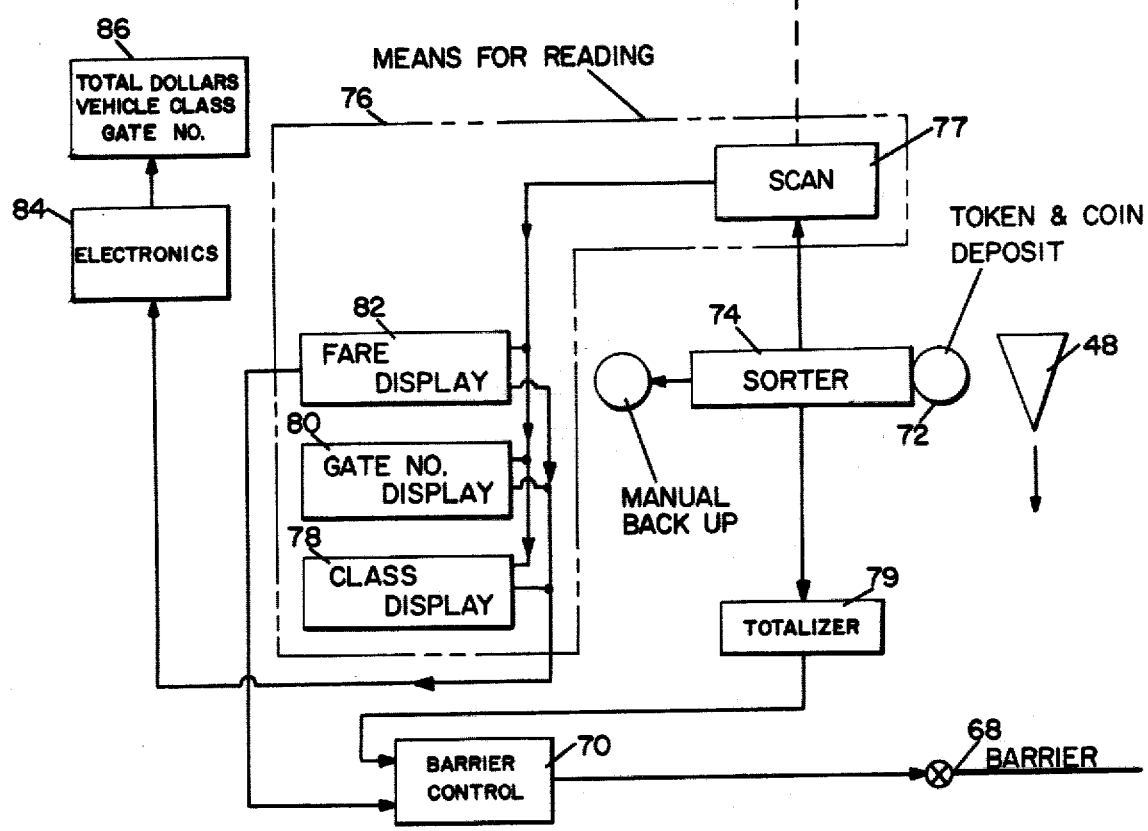

FIG. 2 illustrates the system of this invention wherein a vehicle 48 entering a turnpike or enclosed area is confronted by a barrier 50 controlled by a gate mechanism 52 which is operatively connected to a token distributor 54. The token distributor 54 may be similar to any type of well-known, commercially-available device which presents a token or card when a vehicle 48 trips a switch.

A means for writing 56, as shown in dashed lines in FIG. 2, is operatively connected between a token hopper 58 and the token distributor 54. A token conditioner 59 is included in the means for writing 56 and is basically an electromagnetic device to generate a high magnetic field of about 10,000 gauss which erases any magnetic information and causes the token to be uniformly magnetized through its thickness. The token is subsequently encoded by a gate encoder 60 which notes in magnetic form the gate number or other information. A visual encoder impresses a visual representation of the original points of the token. If desired, a class of vehicle encoder 64 may also be utilized in the means for writing. It is used in conjunction with a class sensor 66 and encodes a signal on the token which denotes the type of vehicle, such as an automobile, small truck, large truck, etc. This is normally necessary on turnpike systems which different rates are changed for automobiles and trucks.

After accepting a token, the vehicle 48 is allowed to pass through the barrier 50. At a desired exit, the vehicle 48 encounters a barrier 68 which is controlled by a barrier control 70. At the exit, the vehicle deposits the token 10 in a hopper 72 which passes through a commercially-available sorter 74. The token is appropriately channeled to pass through a means for reading 76 the information on the token. The means for reading 76 includes an electromagnetic scanner 77 which senses the magnetic information, converts it to electrical signal and displays the information with a class display 78, gate display 80 and fare display 82. The scanner 77 is a Hall Effect generator which gives an electrical output as a result of a magnetic flux field but other devices may be feasible. Hall Effect generators commonly have two inputs - current and a magnetic flux field and an output which is a voltage proportional to the vector cross product of the two inputs. A Hall Effect generator which has been found successful is one produced by F. W. Bell, Inc., Model No. JA618, but others may be used. If desired, a totalizer 79 of coins deposited may be utilized in conjunction with the means for reading 76 in order to collect the fare distributed in the hopper. When the amount shown on the fare display 82 is matched by the amount on the totalizer 79, a signal is given to the barrier control to move the barrier 68. If desired, additional electronics 84 may be utilized to totalize the fares, vehicles, classes and gates in a readout device 86.

It can be appreciated that if the proper coins are available in the vehicle 48, it would not be necessary to have any human intervention in the entire system. It should also be noted that the tokens that have been read are routed to the token hopper 58 where they are recycled for use at the same exit. It should also be appreciated that the invention is not limited to turnpike uses but can be adapted to anything such as a parking lot or other type of arrangements where information is necessary concerning a vehicle entering and exiting.

Figure 3:
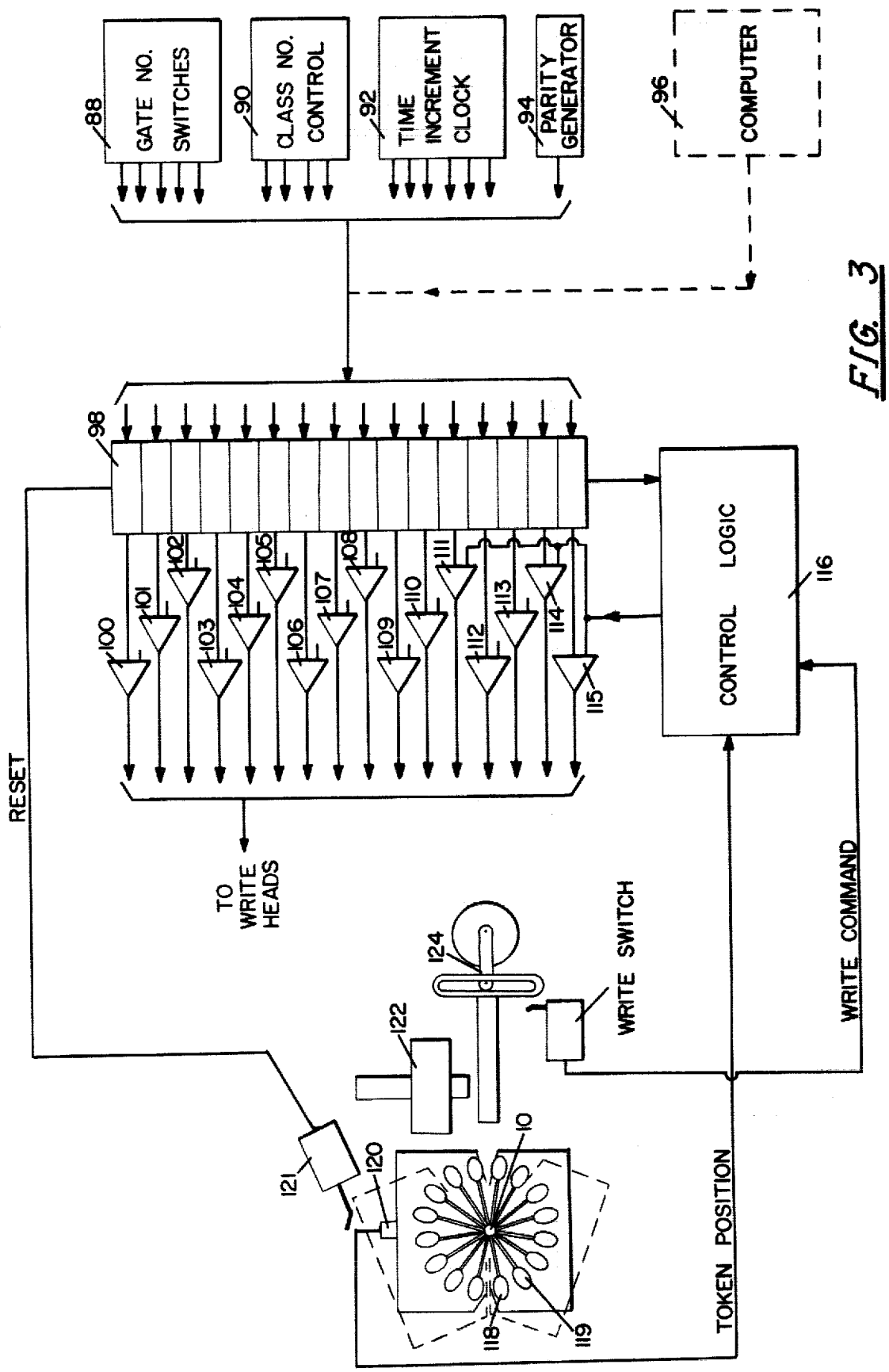
FIG. 3 is a schematic representation of the electrical-mechanical means for placing information on a token.

The means for writing is shown in more detail in FIG. 3 for a turnpike application. It shows in block diagram digital inputs relating to gate switches 88, class control 90 and a time increment clock 92. There are five inputs for the gate switches giving a total number of inputs of 32 possible combinations. Similarly, class control 90 has a possibility of 16 combinations, the time increment clock has 64 possibilities which can be used to relate the minutes and hours. A parity generator 94 can be used to check the information. The parity generator basically places a data bit on the token to make an odd or uneven number as desired. By way of example, an odd parity is used herein. If the number of data bits are already odd, the parity data bit will not be magnetized by the parity generator 94. Later, the number of data bits will be counted to determine if the number is odd as required. Any discrepancy in the parity signal will indicate that the token has been altered. If desired, a computer 96 may accept the information from the differential elements, operate on it and transmit it to a 16-bit shift register 98, or alternately called an information register, which is operatively connected to write amplifiers 100 through 115, respectively. Alternately, the computer 96 could be replaced by a set of switches. The write amplifiers are also electrical gates used in conjunction with a control logic 116. Some of the wiring to the amplifiers is shown symbolically. When appropriate information is received and a write command is given through the control logic 116, the information is transmitted to a series of electromagnets 119 on an electromagnetic write head 118. Specifically, the control logic 116 receives a signal from the register that it is full and that the token is in position. It then transmits a signal to the appropriate amplifiers which permits the desired electromagnets 119 to be energized. Each of the magnetic heads are individually controlled and operatively connected to one of the write amplifiers 100 through 115. As shown in phantom, the write head 118 is separable into two sections which are operated by mechanical linkage to open and receive the token in the center thereof. When the token is in the write head 118, a token sensor 120 signals the control logic 116 to that effect. The write head 118 could have other configurations, including a stationary group of magnetic coils with an appropriate opening through which the token could be inserted.

Previous to writing on the token 10, it is erased by a conditioner head 122 which is a strong electromagnet. The electromagnet, such as that manufactured by F. W. Bell, Inc., Model No. CS-6020, creates a strong magnetic field of about 10,000 gauss which polarizes the token. That is, the token is magnetized through its entire width and one side is the north pole and the other side is the south pole. Alternately, the token may be demagnetized by submitting it to a decreasing alternating magnetic field. The information is placed on the token by reversing the polarity of a small area with the electromagnetic head 118. In particular, the small electromagnets 119 are selectively energized according to signals from the write amplifiers 100 through 115. The electromagnets 119 reverse and/or determine the magnetic polarity of the token over an area about equal to the electromagnet heads 119.

Normally, the electromagnetic heads 119 create a field through the thickness of the token in a linear fashion so that the magnetic area can be sensed from either side of the token. However, it is possible to place magnetic heads in the proximity of the token so that the field penetrates the token in a non-linear fashion. This latter technique has application in placing a magnetic visual image at the center 146 of the token. That is, one magnetic numeral may be placed on one side of the token and a different numeral on the other side of the token. This variation can be accomplished by using magnetic pole pieces in the shape of numerals on the sides of the token. For example, a pole having a shape of the numeral 3 may be placed on one side of the token and the numeral 2 on the other side. When a magnetic field is impressed between the poles, the magnetic flux lines follow the path of least resistance and concentrate in the shape of the numerals at the surface of the token. The magnetic poles are normally placed about one ten thousandth of an inch from the surface of the token.

The token passes under the conditioner head 122 into the writing head 118 by means of a drive motor and gear train 124 which is also used to actuate a write switch 126 so that writing occurs on the token at the correct time. A reset switch 121 clears the shift register 98 when the write head 118 opens. In simpler embodiments, e.g. where only a gate number is involved, the shift register 98 could be eliminated.

Figure 4:
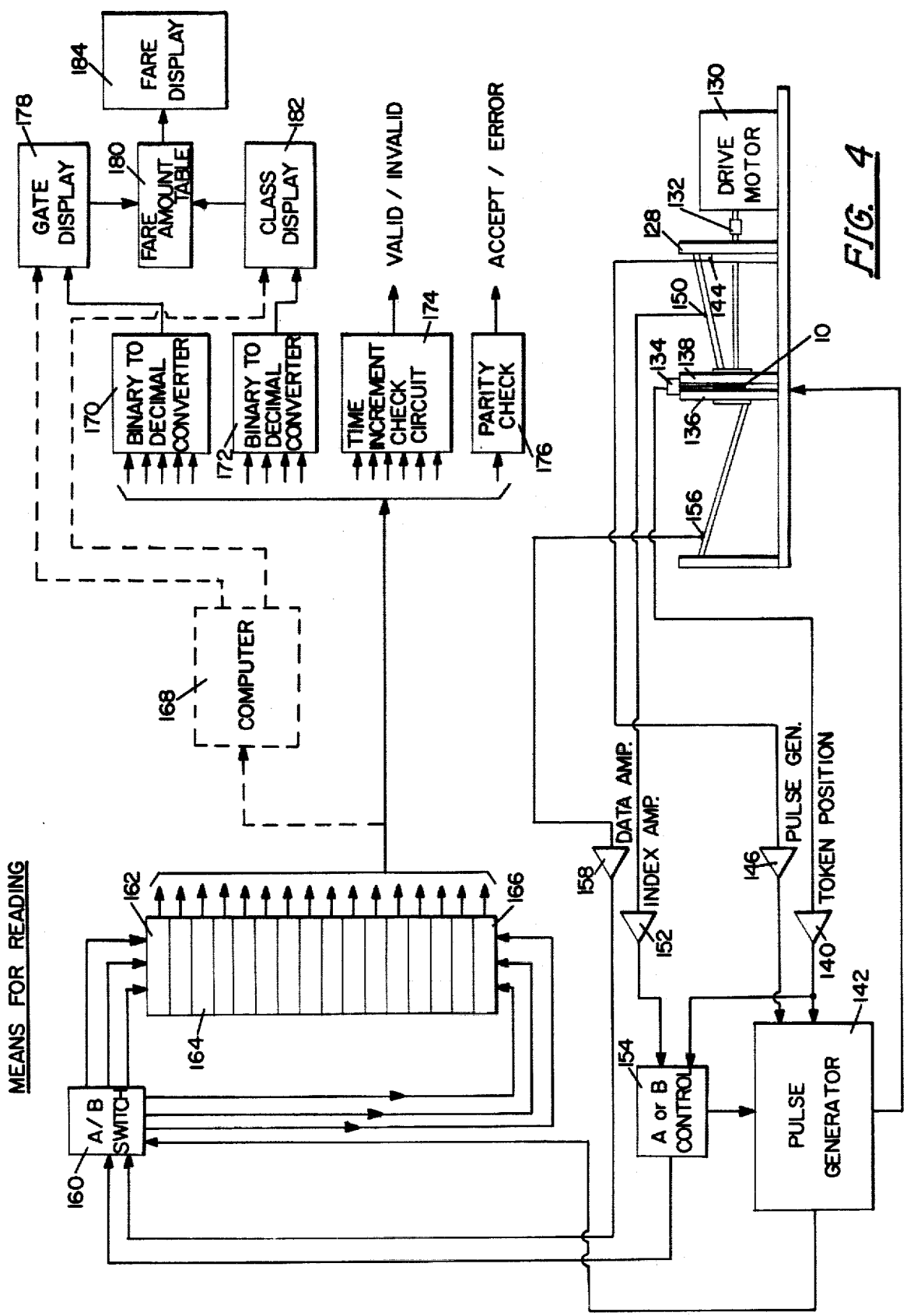
FIG. 4 is a partially schematic and partially block diagram of the components for reading information on a token.

The means for reading 76 a token 10 is shown in more detail in FIG. 4. The token 10 may be placed in location in a token scanner 128 by any one of a number of manual or mechanical means. It is highly advantageous, however, if the token 10 can be funneled through a simple coin collector and segregated by size without concern as to which side of the token is to be read. Thus, in the present invention, the token 10 is located in the token scanner 128 without regard to its relative orientation. The token scanner 128 includes the drive motor 130 turning a shaft 132. A token sensor 134 notes the presence of a token between the supports 136 and 138. The type of sensor utilized is optical or mechanical. A signal from the token sensor 134 is transmitted through an amplifier 140 to a 16-pulse generator 142. Sensor 144 senses the pulse generated and this signal is transmitted through an amplifier 146 to the pulse generator 142. A sensor 150 notes the index signal amplitude and generates a signal transmitted through an index amplifier 152 to a switching mechanism (A or B control) 154. The sensor 150 senses the magnetic field from a data bit 44 on the token which has been previously established. For example, one side (Side A) of the token may be the north pole and the other side (Side B) may be the south pole. Since the magnetic sensors, including sensor 150, are Hall Effect devices and their corresponding amplifiers are of the direct current type, the index voltage level signal appears for Side A, north pole, as a relatively high voltage, for example 9 volts. Then the direction of pulse 44, south pole, appears as a low voltage, for example 3 volts. If the other side is presented, the voltage level is reversed.

The index amplifier 152 is operatively connected to the sensor 150 and transmits a signal to an averaging or integrator circuit noted as A or B control 154. The control circuit 154 conveys an average high or low signal to an A/B switch 160 which sends the signal to the top 162 or bottom 166 or a 16-bit storage means or shift register 164 depending on which side of the token 10 is being scanned. For those skilled in the digital computer art, pulse duration techniques could be used to determine Side A or Side B.

The switching provides that the data in the 16-bit register is always in the same and correct position for utilization in the computer and display units. If Side A is scanned for the data, for example, the sensing of the data bits may be clockwise, whereas if Side B is scanned, the data pickup may be counterclockwise. In this manner, the A/B switch 160 is used to shift the data serially into the register 164 from either the top 162 or bottom 166.

The shift register 164 may be operatively connected through a computer 168 to a series of binary-to-digital converters 170, 172, 174 and 176 which relate to the information concerning gate, class, time and parity, respectively. The binary-to-decimal converters are of types well known in the industry and do not form a specific part of this invention. Once converted to decimal form, the information is sent to circuitry including a gate display 178, a fare rate display 180, a class display 182 and a total fare display 184. The gate display 178 and class display 182 with their associated circuitry combine the circuitry in the fare table 180 to calculate the total fare at the fare display 184. The specific circuitry to multiply inputs is well known and could be a microprocessor and its associated components.

The time increment check circuit 174 may be utilized to see if anything is irregular concerning the time of entry and exit onto the controlled road. If there is no problem, it simply shows a valid signal but if a predetermined time has elapsed (such as several days), an indication is given to show that the token is invalid.

A parity check 176 reviews the information as a group to determine if it is valid. The parity check 176 is given a signal which represents the total number of data bits. In the embodiment used as an example herein, there should always be an odd number of data bits. If there is an even number of data bits, an error signal will be generated.

An index pulse from the sensor 150 also establishes synchronization among the 16 shift pulses, information from a data read scanner 156 (and its associated amplifier 158) and the scanner mechanics. To facilitate the synchronization, the speed gear is attached to the motor shaft so that the sensor 150 generates 512 pulses per scanner head revolution. The data read scanner 156 and the index pulse from the sensor 150 are coordinated by mechanical means so that if either Side A or Side B is scanned, the two pulse sources are synchronized. The particular coordination may be done in different ways and will be known to those skilled in the art.

A successful example of a type of synchronization is where the recorded data from the data amplifier 158 and the index pulse from the index amplifier 152 are mechanically correlated in the means for writing. The index pulse is aligned with the parity pulse. Since the token can be angularly positioned anywhere in the slot and at any time, no timing or positioning is possible except by electronic means of generation of synchronization from the index amplifier 152 which is always present. When the token is detected to be in position by the sensor 134, a single pulse multivibrator generator 142 may be triggered.

Other types of scanners may be utilized with this invention and they will be obvious to one skilled in the art. Other variations in the system and process of this invention will be apparent to those knowledgeable in the art and are considered as part of this invention. For example, the token could be a solid, magnetic metallic coin or a pair of interfitted, facing cup-like magnetic metallic members. This invention is also equally applicable to parking garages, security systems, or other applications requiring the transfer of information.

The invention claimed is:

1. A process for controlling limited access areas comprising:
   preparing a token which is magnetizable;
   impressing information in the form of magnetic data bits on the token through its entire thickness by submitting small areas of the token to magnetic fields;
   distributing the token;
   retrieving the token;
   scanning the data bits on the token to decide which side of the token is being viewed;
   converting the magnetic information to electrical signals; and
   feeding the electrical signals into circuitry which can process it in a readable manner.

2. The process of claim 1 wherein the token is prepared by submitting it to a decreasing alternating magnetic field in order to demagnetize it.

3. The process of claim 1 wherein the token is prepared by submitting it to an electromagnetic field in order to create a north and south pole through its thickness.

4. The process of claim 3 wherein the information placed on the token represents class of vehicle, the gate of entry and time increments.

5. The process of claim 4 in which the token is reprocessed by removing the magnetic data bits on the token.

6. The process of claim 5 wherein the electrical signals generated from the circuitry after scanning the magnetic information are converted to decimal form.

* * * * *